Figure 4:
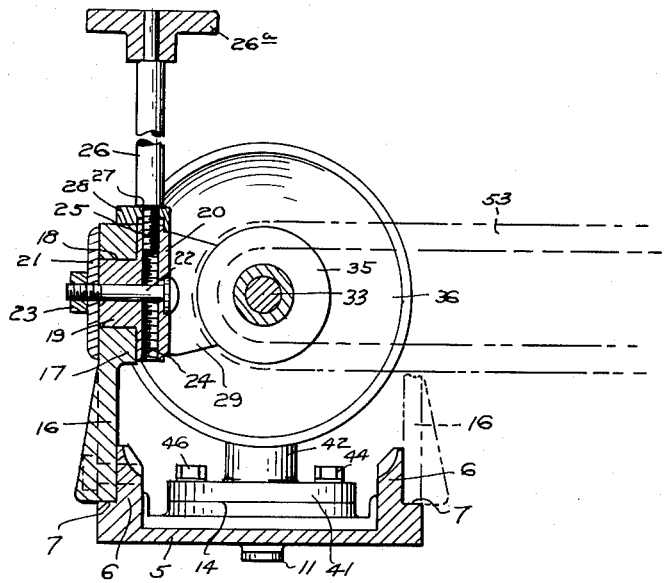

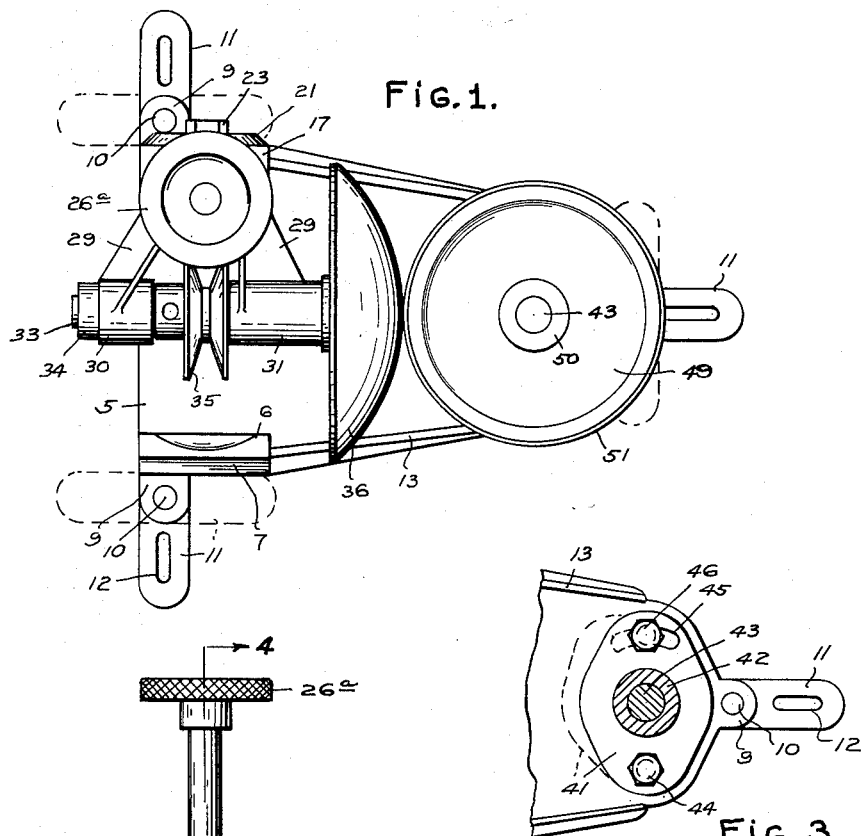
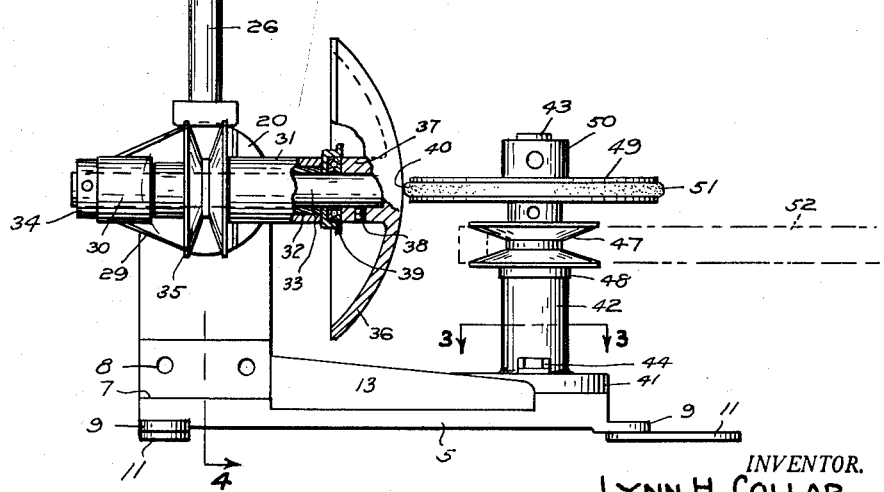

March 13, 1956      L. H. COLLAR      2,737,820
VARIABLE SPEED FRICTION DRIVE DEVICE Filed April 28, 1955      2 Sheets-Sheet 2

INVENTOR.
LYNN H. COLLAR,
BY
ATTORNEY

United States Patent Office 2,737,820
Patented Mar. 13, 1956

2,737,820

VARIABLE SPEED FRICTION DRIVE DEVICE

Lynn H. Collar, Miami, Fla.

Application April 28, 1955, Serial No. 504,490

6 Claims. (Cl. 74—198)

This invention relates to a variable speed friction drive device for imparting a variable speed transmission to various mechanical devices from a fixed prime mover.

The invention contemplates a friction drive that is variable from a dead stop position to a progressively increasing speed drive, both forwardly and reverse.

The invention further contemplates a novel mounting structure that facilitates the positioning and adjustment of the transmission in order to accurately dispose the device in proper driving relation to the device to be driven.

The invention further contemplates novel means whereby a member driven from the prime mover may be quickly and easily detached and replaced upon the mounting at an opposite side to facilitate the assembly of the device in accordance with the prime mover and the device to be driven.

Novel features of construction and operation of the device will be clearly apparent during the course of the following description, reference being had to the accompanying drawings, wherein has been illustrated a preferred form of the device and wherein like characters of reference are employed to denote like parts throughout the several figures.

Figure 5:
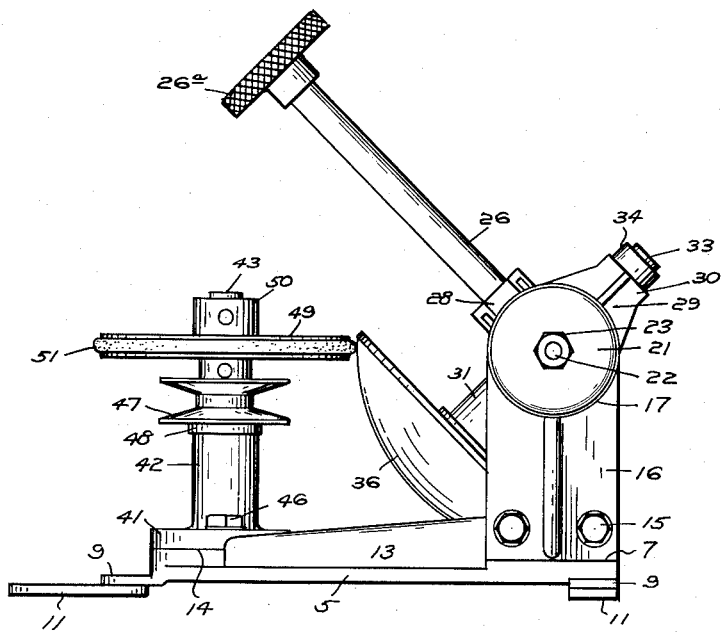

In the drawings:

Figure 1 is a top plan view of a transmission constructed in accordance with the invention, Figure 2 is a side elevation, parts being broken away for sake of clearness, Figure 3 is a horizontal section taken substantially on line 3—3 of Figure 2, Figure 4 is a transverse vertical section taken substantially on line 4—4 of Figure 2, and Figure 5 is a side elevation of the device taken from the opposite side to that shown in Figure 2.

Referring specifically to the drawings, the numeral 5 designates a base, preferably cast from a suitable metal. The base 5 at one end and upon opposite sides is provided with upstanding flanges 6 that are offset inwardly to provide shoulders 7. The flanges 6 are identical and are apertured and threaded at spaced apart points, as at 8. The base is further provided with preferably integral and outwardly extending tongues 9 to which are pivotally connected, as at 10, horizontally swingable mounting wings 11. Each of the wings 11 is slotted at 12 for the passage of mounting bolts, not shown, through the medium of which the device is rigidly and adjustably mounted upon a supporting structure. As clearly shown in Figure 1, a pair of the tongues 9 extend outwardly from opposite sides of the base adjacent the flanges 6, while a third tongue 9 extends outwardly from the opposite end of the base, clearly shown. The base may be of any particular design but is here shown tapering forwardly and reinforced by longitudinal ribs 13. The base at its end opposite from the flanges 6 is increased in thickness to provide a flat mounting surface 14 for the adjustable mounting support of a driven friction disc, to be described.

Rigidly and detachably bolted to one flange 6 as by bolts 15, is a vertically disposed bracket plate 16 having an upper cylindrical head portion 17 that is concentrically apertured, as at 18. The shoulders 7 and the flanges 6 maintain the bracket plate 16 in accurate supporting engagement with the base 5 upon either side of the device. Rotatably supported within the aperture 18 is a hub 19 formed upon a cylindrical head 20. The head 20 has frictional rotative contact with the inner surface of the head 17, while the hub 19 terminates flush with the outer surface of the head 17 for combined frictional engagement with a friction disc 21 that is simultaneously held in frictional engagement with the end of the hub 19 and the outer surface of the head 17 by a bolt 22 that passes through an axial opening that extends through the head 20 and the hub 19 to project through an opening formed in the disc 21 where it is engaged by a nut 23. The head 20 has been drilled and threaded transversely, as at 24, for the threaded engagement of the threaded end 25 of a clamping screw 26. The clamping screw 26 is shouldered at 27 for binding engagement upon a clamping plate 28 that overlies the head 20 and the head 17, whereby to impart a clamping engagement simultaneously between the head 20 and the head 17 for retaining the head 20 in a fixed degree of adjustment. The head 20 is provided with forwardly extending and reinforced arms 29 carrying at their free ends a pair of axially aligned and spaced apart tubular hubs 30 and 31. The hubs 30 and 31 may be provided with any suitable wear-resisting bushings 32, see Figure 2. Journalled within the hubs 30 and 31 is a shaft 33 held against movement in one direction by a collar 34. Fixed upon the shaft 33 between the spaced apart hubs 30 and 31 is a grooved pulley 35 with its circumferential center being directly on the line of the axial center of the head 20. The shaft 33 extends beyond the hub 31 and has fixed thereon a convex variable speed driving head 36. The head 36 is provided with an inner hub 37 that is fixedly engaged with the extended end of the shaft 33 by a set-screw 38. Any suitable thrust bearing 39 may be interposted between the free end of the hub 37 and the forward end of the hub 31. The arc of the convex head 36 has been struck from the axial center line of the head 20, as will be apparent, so that a substantially identical driving surface is presented at all times throughout the rotative adjustment of the head 20. The head 36 is preferably slightly flattened at the axial center of its bearing surface, as at 40, for a purpose to be presently described.

Adjustably supported upon the flat supporting surface 14, is a flanged mounting plate 41, carrying a centrally arranged upstanding tubular hub 42 for the journal reception of a vertically disposed shaft 43. One flange of the plate 41 is pivotally connected, as at 44, to the base 5, while an opposite flange is arcuately slotted at 45 for the passage of a clamping bolt 46 through the medium of which the plate 41, the hub 42 and associated mechanism may be adjusted in a horizontal plane and rigidly clamped in position after adjustment. Fixedly connected with the shaft 43, above the hub 42, is a grooved pulley 47 engaging a thrust bearing 48 disposed upon the upper end of the hub 42. Fixedly connected with the shaft 43 above the pulley 47 is a circumferentially grooved disc 49 having an integral centrally disposed hub 50. The groove of the disc 49 is provided with a slightly compressible friction band 51 of any desirable cross-sectional configuration. The band 51, as here illustrated, has been shown as being cylindrical in cross-section, although a flat surface band may conceivably function satisfactorily. The band 51 obviously will be formed of a material capable of withstanding a friction drive thereto from the head 36. As clearly shown, the disc 49 and its supported friction band 51 are adjustable toward and from the drive surface of the head 36 to increase or decrease the frictional contact upon the band in accordance with a device to be driven, as will be presently described. As clearly shown, in Figure 2, the disc 51 is directly centered with respect to the axial center of the head 36 and the shaft 33 when the parts are in the neutral position illustrated and with the band 51 having little, if any, frictional engagement with the flat area 40 of the head 36. It will be understood that the face of the head 36 has been ground smooth whereby the frictional engagement with the band 51 retards the wearing away of the band.

In the use of the device, the base 5 is supported upon a supporting structure adjacent a machine to be driven. It will be assumed that, prior to the installation of the disc 49, a conventional V-belt 52 is engaged about the pulley 47. A V-belt 53 would likewise be engaged with the pulley 35 prior to its engagement with the shaft 33. Now, the base 5 and its supported elements are shifted away from the machine to be driven a distance capable of absorbing the major slack in the belt 52, after which bolts, screws or other fastening means are passed through the slots 12 of the wings 11 into the supporting structure. Through the medium of the pivotally connected wings 11, the base 5 can be shifted about for proper positioning of the transmission with respect to the machine to be driven and for imparting the desired tension to the belt 52. After this adjustment has been determined, the hold-down bolts passing through the slots 12 are tightened, after which a suitable prime mover, such as an electric motor and having a grooved pulley thereon, is engaged with the belt 53 and adjusted toward or from the transmission in order to provide adequate tension upon the belt. Now, with the prime mover in motion, the head 36 is being rotated at a predetermined speed through the medium of the belt 53 and the pulley 35. However, as in Figure 2, no motion is imparted to the disc 49, since the head 36 is in a neutral or non-driving position. Now, when the disc is to be driven for imparting the power drive to a machine, the operator actuates the clamping screw 26 to relieve the clamping pressure upon the clamping plate 28 and, by holding to the clamping screw 26, swings the head 20, its arms 29 and the journalled shaft 33 and head 36 in an arcuate path upon the head 17, causing the true partly spherical surface of the head 36 to progressively engage the band 51, causing the disc 49 to rotate and impart a driving action to the machine to be driven through the medium of the pulley 47 and the belt 52. It will be apparent as the head 36 is progressively rotated, the speed of the disc 49 will be increased as desired. Obviously, the maximum driving speed would be obtained adjacent the circumferential edge of the head 36. It will also be clearly apparent that swinging the head 36 in the opposite direction, past the flat area 40, will impart a reverse drive to the disc 49. The adjustable flanged plate 41 provides a very desirable adjustment for the disc 49 toward the head 36 in accordance with the load being driven from the belt 52. It is well understood that in friction drive devices of this type, the speed of the driven device may be controlled to a fine degree and reversed at will. After the desired speed has been attained, the operator again actuates the clamping screw 26 to bind the head 20 in the adjusted speed position.

Where the mounting of the transmission is such that the operation of the clamping screw 26 might interfere with adjacent structures, the operator may quickly and easily remove the bolts 15 and detach the plate 16. The head 20 is then rotated through an arc of approximately 180 degrees by first removing the clamping screw 26 and the clamping plate 28. The plate 16 is then rigidly bolted in position upon the opposite flange 6, as illustrated fragmentarily in Figure 4, after which the clamping plate and clamping screw are engaged within the threaded opening 24 that extends entirely through the head 20. The operation of the head 36 will then be identical, as before described, except the drive from the prime mover will be from the opposite side. The clamping screw 26 is provided with a knurled head 26a for the convenient rotation of the screw 26, and the screw 26 and its head 26a serve both as an adjustment clamp and a handle through the medium of which the head 20 and associated parts may be rotated.

It will be apparent from the foregoing that a very novel form of variable speed friction transmission has been provided. The device is extremely flexible as to its mounting and operation and readily adapts itself as a variable speed drive for many types of machines and provides a speed control means having a wide range of adjustment from a neutral to any required R. P. M. Through the same drive means, the device is readily reversible. The structure is simple, strong, durable, easily and quickly mounted and adjusted upon a supporting surface, is cheap to manufacture and is highly sensitive as a variable speed transmission. The disc 49 is easily adjustable toward and from the head 36 as a means to impart the desired compressive frictional engagement upon the band 51. Thus, in light machinery where the load is relatively light, the disc 49 may be adjusted in a manner to minimize the frictional wear upon the band 51. The band 51 is quickly and easily replaced when worn and presents substantially the only part of the device that might require a replacement. All other parts are suitably bushed and provided with thrust bearings to minimize the wear. It will be apparent, of course, that suitable lubricating fittings will be associated with the rotating shaft sections 33 and 43.

It is to be understood that the invention is not limited to the precise construction shown, but that changes are contemplated as readily fall within the spirit of the invention as determined by the scope of the subjoined claims.

Having described my invention, what I claim as new and desire to secure by Letters Patent is:

1. A variable speed power transmission device that embodies a driving member and a driven member, a base plate for the mounting support of the members, a bracket plate detachably connected to the base at one end, a cylindrical head formed upon the upper end of the plate, a second head horizontally rotatable with respect to the first named head, lock means whereby to hold the second named head against rotation, co-axial bearings carried by the second named head, a shaft journalled in the bearings, a power input pulley fixed upon the shaft, a partly-spherical convex driving head fixed upon an extended end of the shaft, the shaft and its convex head being oscillatable in a vertical plane toward and from the base, the plate and associated elements being reversible to an opposite point of connection with the base, the driven member embodying a disc having a circumferential friction band and with the horizontal center line of the disc being in direct alignment with the axial center line of the convex head when the head is in a neutral position with its shaft horizontally arranged, a journal bearing having a base plate that is supported upon the first named base, a vertical shaft journalled in the last named bearing and with the shaft projecting above the bearing, the said disc being fixed upon the upper end of the shaft, a power take-off pulley fixed upon the last named shaft, the said base plate for the last named bearing being adjustable upon the first named base whereby to adjust the disc and its friction band toward and from the convex head for increasing or decreasing frictional driving contact therewith and mounting members connected to the first named base whereby to vary the angularity of the transmission in a horizontal plane with respect to a device being driven by the disc and its associated take-off pulley.

2. The device according to claim 1, wherein the first named heads are co-axial with respect to each other and with the second named head being provided with a cylindrical hub that is rotatable within an axial opening of the first named head, means for frictionally binding the heads together, a locking plate that overlies both heads and a screw device passing through the locking plate and having threaded engagement within a threaded opening of the second named head whereby to hold the second named head against rotation with respect to the first named head.

3. The device according to claim 1, wherein the base is provided with oppositely disposed upstanding flanges that are inwardly offset to form supporting and aligning shoulders, the said flanges being identically apertured and threaded for the reception of fastening screws whereby to mount the plate upon either side of the base in a similar position of operation of the convex head with respect to the disc.

4. The device according to claim 1, wherein the disc is circumferentially grooved for the seating reception of the circumferential friction band and with the band projecting outwardly from the marginal edge of the disc, the said base plate for the last named bearing being pivotally supported upon the base to be shiftable in a horizontal plane and with the base plate being also arcuately slotted for the passage of a clamping bolt that has threaded engagement with the base whereby to rigidly fix the base plate in a position of adjustment for maintaining the friction band in a predetermined degree of pressure against the convex head.

5. The device according to claim 1, wherein the mounting members for the base embody a plurality of wings that are pivotally connected at one end to the base to be shiftable in a horizontal plane, each of the wings being slotted for the passage of hold-down bolts that engage in a supporting structure whereby to permit the transmission device to be shifted about in a horizontal plane for imparting a desired tension upon a power take-off belt driven from the power take-off pulley.

6. The device according to claim 3, wherein the threaded opening of the second named head extends entirely through the head transversely whereby to engage the locking plate and the screw device upon the opposite side of the head when the plate and asssociated elements are positioned upon the opposite side of the base.

References Cited in the file of this patent

UNITED STATES PATENTS

| | | |
|---|---|---|
| 138,522 | Parker | May 6, 1873 |
| 667,220 | Hughes | Feb. 5, 1901 |
| 1,143,048 | Hunt | June 15, 1915 |

FOREIGN PATENTS

| | | |
|---|---|---|
| 329,067 | Great Britain | May 15, 1930 |